(12) United States Patent
Slattery

(10) Patent No.: US 6,779,708 B2
(45) Date of Patent: Aug. 24, 2004

(54) JOINING STRUCTURAL MEMBERS BY FRICTION WELDING

(75) Inventor: Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 10/319,109

(22) Filed: Dec. 13, 2002

(65) Prior Publication Data

US 2004/0112941 A1 Jun. 17, 2004

(51) Int. Cl.⁷ ............................................. B23K 20/12
(52) U.S. Cl. ................................. 228/112.1; 228/212
(58) Field of Search ............................. 228/1.1, 110.1, 228/2.1, 2.3, 112.1–114.5, 44.3, 212, 213; 156/73.1, 73.5, 580.1, 580.2

(56) References Cited

U.S. PATENT DOCUMENTS

| | | | | |
|---|---|---|---|---|
| 4,063,676 A | * | 12/1977 | Lilly | ........................... 228/114 |
| 5,248,077 A | | 9/1993 | Rhoades et al. | |
| 5,366,344 A | * | 11/1994 | Gillbanks et al. | ........ 416/213 R |
| 5,486,262 A | | 1/1996 | Searle | |
| 5,682,677 A | | 11/1997 | Mahoney | |
| 5,697,544 A | | 12/1997 | Wykes | |
| 5,718,366 A | | 2/1998 | Colligan | |
| 5,769,306 A | | 6/1998 | Colligan | |
| 5,794,835 A | | 8/1998 | Colligan et al. | |
| 5,865,364 A | | 2/1999 | Trask et al. | |
| 5,971,247 A | | 10/1999 | Gentry | |
| 6,050,474 A | | 4/2000 | Aota et al. | |
| 6,068,178 A | | 5/2000 | Michisaka | |
| 6,070,784 A | | 6/2000 | Holt et al. | |
| 6,095,402 A | | 8/2000 | Brownell et al. | |
| 6,106,233 A | * | 8/2000 | Walker et al. | .......... 416/213 R |
| 6,142,360 A | * | 11/2000 | Hutt | ......................... 228/114.5 |
| 6,168,066 B1 | | 1/2001 | Arbegast | |
| 6,173,880 B1 | | 1/2001 | Ding et al. | |
| 6,219,916 B1 | * | 4/2001 | Walker et al. | ............ 29/889.21 |
| 6,485,240 B2 | * | 11/2002 | Stumpf et al. | ............... 411/171 |
| 2001/0024606 A1 | * | 9/2001 | Stumpf et al. | ................. 411/82 |
| 2003/0111514 A1 | * | 6/2003 | Miyanagi et al. | ......... 228/112.1 |
| 2004/0004108 A1 | * | 1/2004 | Halley et al. | ............... 228/56.3 |

FOREIGN PATENT DOCUMENTS

| | | | |
|---|---|---|---|
| EP | 1048390 A2 | 11/2000 | |
| EP | 1057572 A2 | 12/2000 | |

* cited by examiner

Primary Examiner—Kiley Stoner
(74) Attorney, Agent, or Firm—Alston & Bird LLP

(57) ABSTRACT

An apparatus and method for joining structural members to form preforms and structural assemblies are provided. The structural members are positioned so that joining surfaces thereof define an angled aperture, such as a slot or frustoconical bore, that receives a corresponding joining member. The joining member is urged into the aperture against the joining surfaces and moved, for example, by oscillating or rotating the joining member, to friction weld the joining member to the structural members. Each structural member can include a clamping portion that is received by a clamping device that prevents the aperture from opening as the joining member is urged into the aperture. A gripping portion of the joining member and the clamping portions of the structural members can be trimmed from the resulting preform to form a finished structural assembly.

19 Claims, 10 Drawing Sheets

JOINING STRUCTURAL MEMBERS BY FRICTION WELDING

FIELD OF THE INVENTION

This invention relates to friction welding and, more specifically, to friction welding of one or more structural members to form a structural assembly.

BACKGROUND OF THE INVENTION

Structural devices are often formed as assemblies of a number of smaller structural members. Such assembling of individual members may be necessary to form devices that are too large or too complicated to be formed by conventional manufacturing methods. For example, such factors as casting sizes, forging sizes, available plate and block sizes, and the like can limit the size and geometry of the structural members that can be manufactured. To form larger or more complex devices, the structural members are typically assembled by joining the individual structural members using a variety of known joining techniques including, for example, mechanical fastening or welding.

Joints formed by mechanical fasteners such as rivets, screws, and bolts typically require an overlap of the structural materials at the joint. The fasteners and the overlap of material result in an increase in weight of the joint and the structural assembly. The joint can also introduce areas of increased stress, for example, around holes drilled for receiving rivets. Alternatively, weld joints can be formed to join the structural members, sometimes requiring little or no overlap of material. However, the formation of conventional weld joints, such as by arc or electron beam welding, can result in undesirable dimensional changes in the structural members. Welding can also introduce porosity or other discontinuities into the structural members or otherwise cause unwanted changes to the material properties of the structural members.

Friction welding has also been proposed as an alternative to conventional welding methods for joining members. Linear friction welding, and rotational friction welding can be used to form strong joints without reducing the mechanical characteristics of the joined materials or causing significant dimensional changes. However, each of these conventional friction welding techniques is limited by the dimensions of the structural members and/or the joints to be formed. For example, conventional linear friction welding and rotational friction welding require one member to be moved, i.e. oscillated or rotated, and urged against the other member. Because of the difficulty of moving large structural members, it can be impossible or impractical to join some structural members by these techniques.

Thus, there exists a need for an improved apparatus and method of joining structural members to form structural assemblies. Preferably, the method should enable the manufacture of preforms that approximate the desired dimensions and configuration of the structural assembly and therefore require little machining or other subsequent processing to form the structural assemblies. The method should be adaptable for joining large and/or complex structural members. Further, the method should not add significant weight to the structural assembly, and should minimize dimensional changes and undesirable changes to the material properties of the structural members.

SUMMARY OF THE INVENTION

The present invention provides an apparatus and method for joining structural members to form preforms and structural assemblies. A joining member, which can be smaller than the structural members, is friction welded to join the structural members. The structural members can remain stationary during the joining process and can be large or complex. The friction welding process provides a strong joint without appreciably detracting from the dimensional or material characteristics of the members. Further, the joint can be formed without an overlap of material or other undue additions of weight.

According to one embodiment of the invention, first and second structural members are positioned proximately so that first and second joining surfaces define an angled aperture between the members. In other embodiments, more than two structural members can be positioned to define the aperture so that at least three members are joined. The aperture can be a slot that extends generally uniformly through the members or a frustoconical aperture. A joining member is urged into the slot and against the joining surfaces and moved relative to the members to friction weld the joining member thereto. For example, the structural members can be disposed substantially within a plane and the joining member can be urged in a normal direction generally perpendicular to the plane. The joining member can be moved alternately in first and second opposed directions that are generally parallel to a lengthwise direction of the slot. Alternatively, the joining member can be rotated about an axis generally collinear with a longitudinal axis of the aperture.

According to one aspect of the invention, each structural member defines a clamping portion that extends from the respective structural member and defines a clamping surface, which can be generally parallel to the direction of urging of the joining member. The clamping portions can be inserted in a clamping channel of a clamping device so that the clamping device contacts the clamping surfaces to prevent the aperture from opening while the joining member is urged against the joining surfaces. A space can be provided between the clamping device and the joining member to receive flash from the joining member and the joining surfaces. Additional structural members can also be friction welded to the first and second structural members to maintain their relative positions and prevent the aperture from opening. According to another aspect, the structural members include alignment portions that are engaged to define an interface.

The joining member can be urged against the structural members after the motion of the joining member is terminated to form friction weld joints between the joining surfaces and the joining member as the joining surfaces and the joining members cool. Further, the clamping portion and/or gripping portions can be trimmed from the structural and joining members.

The present invention also provides a preform for use in forming a structural assembly of predetermined dimensions. The preform includes first and second structural members, which can be formed of aluminum, aluminum alloys, titanium, titanium alloys, steel, nickel-based alloys, copper-based alloys, or beryllium-based alloys. Each of the structural members can be formed of the same or different materials, such that the preforms and structural members formed according to the invention can comprise a single or multiple materials. The structural members define joining surfaces, which define an angle therebetween. A joining member corresponding to the angle is disposed between the joining surfaces and joined by friction weld joints to the joining surfaces. Each structural member also defines a clamping portion that extends from the respective structural member. The clamping portions define generally parallel clamping surfaces for engaging an aperture of a clamping device. According to one aspect of the invention, the joining member defines a generally frustoconical plug and the joining surfaces define a generally frustoconical contour corresponding to the joining member. Alternatively, the joining member can define an elongate member and the joining surfaces can define an angled slot that extends generally uniformly in a lengthwise direction of the joining member and corresponds to the joining member.

According to another aspect of the invention, the structural members define alignment portions that are engaged to define an interface therebetween. A space between the interface of the alignment portions and the joining member can be at least partially filled with flash from the joining member and/or the joining surfaces. The joining member can also include a gripping portion that extends from between the first and second structural members.

According to another embodiment, the present invention provides a structural assembly that is formed from the described preform by trimming the clamping portions of the structural members and the gripping portion of the joining member.

The present invention also provides an apparatus for joining at least two structural members to form a structural assembly. The apparatus includes a clamping device that defines a clamping aperture for receiving at least a portion of the structural members so that the structural members define an angled aperture for receiving a joining member. A connection device, configured to be connected to a joining member, is actuated by first and second actuators. The first actuator is configured to urge the connection device toward the clamping device and thereby urge the joining member into the angled aperture between the structural members. The second actuator is configured to move the connection device and thereby friction weld the joining member to the structural members. The clamping device is structured to engage a clamping surface of each structural member to restrain the structural members and thereby prevent the angled aperture from opening. The angled aperture can be a slot, and the second actuator can be configured to move the connection device in first and second opposed directions generally parallel to a lengthwise direction of the slot to friction weld the joining member to the structural members. Alternatively, the aperture can be a generally frustoconical aperture, and the second actuator can be configured to rotate the connection device about an axis generally collinear to the aperture to friction weld the joining member to the structural members. The clamping device can also define a space in the angled aperture for receiving flash from the joining member while the joining member is being joined to the structural members.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
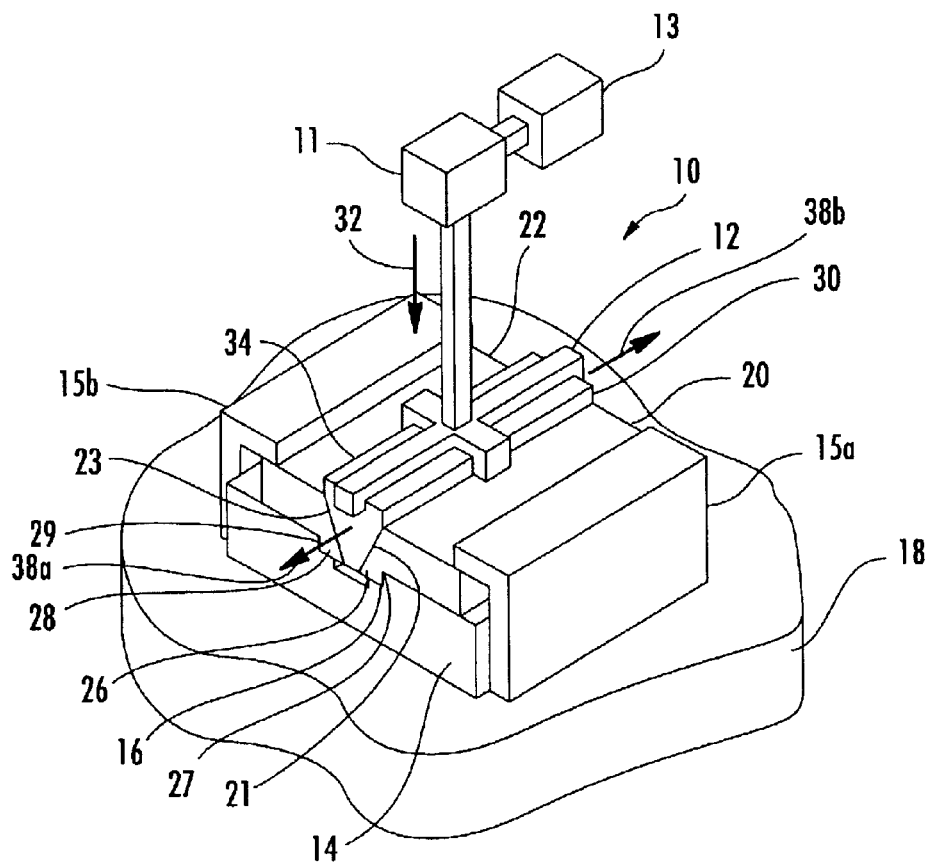
FIG. 1 is a perspective view illustrating first and second structural members being joined by friction welding according to one embodiment of the present invention.
Figure 2:
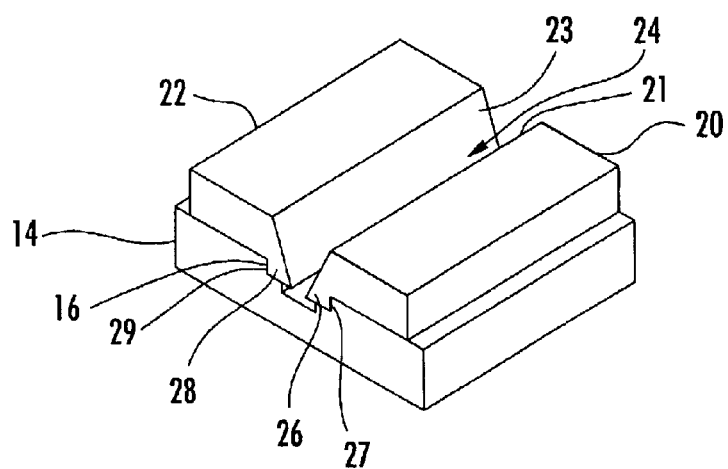
FIG. 2 is a perspective view illustrating the structural members of FIG. 1 configured before being joined.
Figure 4:
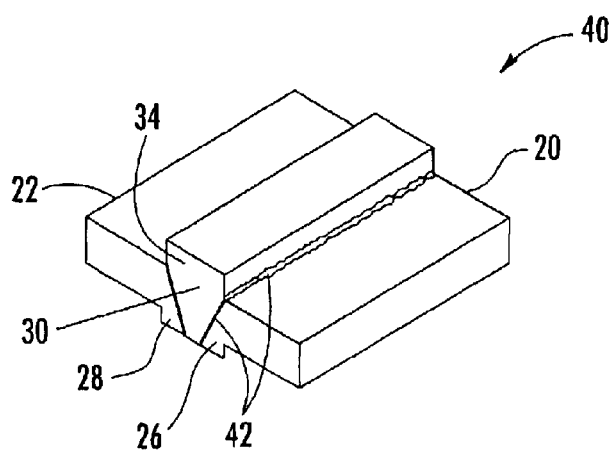
FIG. 4 is a perspective view illustrating the preform of FIG. 3.
Figure 5:
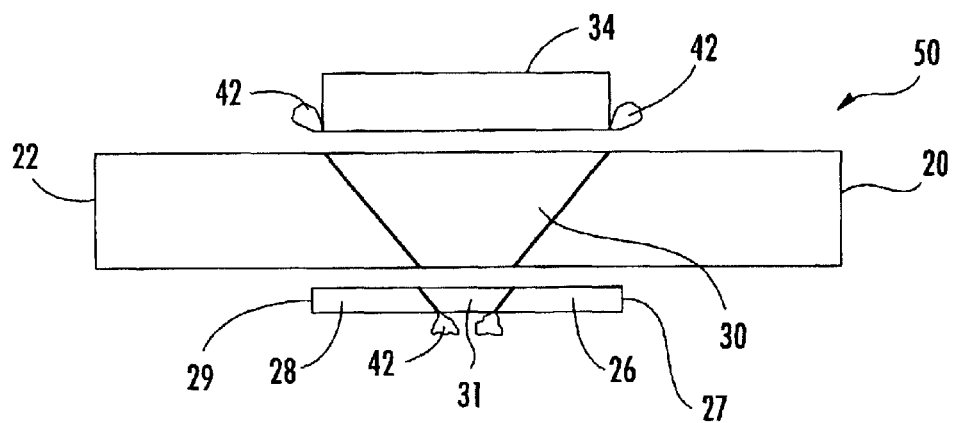
FIG. 5 is a partial elevation view illustrating a structural assembly formed from the preform of FIG. 3.
Figure 6:
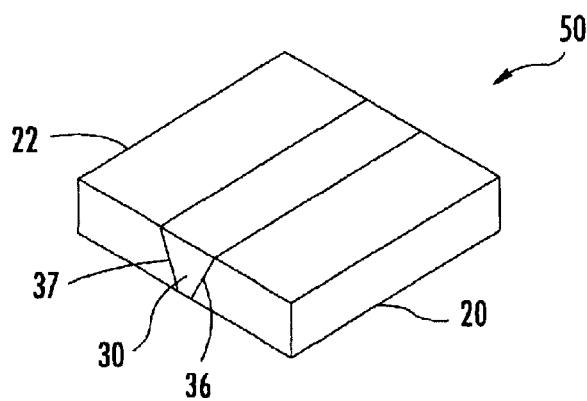
FIG. 6 is a perspective view illustrating the structural assembly of FIG. 5.

Referring to the drawings and, in particular, to FIG. 1, there is illustrated an apparatus 10 for joining structural members 20, 22, also shown in FIG. 2, by linear friction welding according to one embodiment of the invention. The structural members 20, 22 can be joined to form a preform 40, shown in FIGS. 3 and 4, that can be trimmed to form a structural assembly 50, as shown in FIGS. 5 and 6. As illustrated in FIGS. 1–4, the preform 40 is formed by joining the first structural member 20 and the second structural member 22 with a joining member 30. In other embodiments, the preform 40 can be formed from three or more structural members, depending on the desired dimensions and configuration of the preform 40 and the structural assembly 50.

The configuration and material composition of the structural members 20, 22 can be formed and selected according to the specifications and design requirements of the structural assembly 50. The first and second structural members 20, 22 are illustrated in FIG. 1 as generally planar members, but the structural members 20, 22 can also be formed in other configurations, including blocks having rectangular or square cross-sections, tubes and cylinders having circular or oval cross-sections, or angles or channels having a variety of cross-sectional shapes. The structural members 20, 22 can also have irregular geometric configurations. As is known in the art, the structural members 20, 22 can be formed from a variety of fabricating processes including milling, casting, and forging. Preferably, the structural members 20, 22 are formed from materials having high strength to weight ratios and good corrosion resistance. For purposes of example only and not limitation, the structural members 20, 22 can comprise aluminum, aluminum alloys, titanium, titanium alloys, steel, nickel-based alloys, copper-based alloys, beryllium-based alloys, or mixtures thereof. Further, the structural members 20, 22 can be formed from similar or dissimilar materials.

In addition to the material composition and properties of the structural members 20, 22, the selection of the structural members 20, 22 is based on the desired dimensions of the structural assembly 50 that is to be formed. More specifically, the desired dimensions of the structural assembly 50 can be determined first and the structural members 20, 22 can then be selected so that the resulting preform 40 will closely approximate the predetermined dimensions and configuration of the finished assembly 50. Advantageously, by constructing preforms 40 having dimensions and configurations closely or substantially approximating the predetermined dimensions and configuration of the corresponding structural assembly 50, machining time and material waste can be minimized, making the assemblies 50 more economical to produce. The selection of materials and the subsequent formation of preforms and structural assemblies therefrom are described in U.S. application Ser. No. 10/092,675, titled "Preforms for Forming Machined Structural Assemblies," filed Mar. 7, 2002, which is assigned to the assignee of the present invention and the entirety of which is incorporated herein by reference.

The apparatus and method of the present invention can be used to manufacture various types of structural assemblies 50 that comprise part of a vehicle, such as an aircraft. For example, the structural members 20, 22 can be panels, spars, beams, or other components that are joined to form a wing, wing support structure, fuselage, and the like.

As shown in FIGS. 1 and 2, the structural members 20, 22 are configured in the apparatus 10 so that the members 20, 22 define a slot 24 therebetween. The slot 24 is partially defined by joining surfaces 21, 23 of the structural members 20, 22, which are angled relative to one another to define a converging angle that is generally uniform along the length of the slot 24. The joining member 30 preferably corresponds in shape to the slot 24 so that, when the joining member 30 is inserted into the slot 24, the joining member 30 engages the joining surfaces 21, 23 of the structural members 20, 22. The joining member 30 and the joining surfaces 21, 23 of the structural members 20, 22 can define flat surfaces as shown, or each may define a curve or other shape. Thus, the joining member 30 and the slot 24 define a lengthwise direction, which can be linear or non-linear. The apparatus 10 is configured to urge the joining member 30 in a direction 32 into the slot 24, and thereby urge the joining member 30 against the joining surfaces 21, 23 of the structural members 20, 22. The apparatus 10 can include a first actuator 11 such as a hydraulic, pneumatic, or electric actuator for urging the joining member 30 against the structural members 20, 22. The first actuator 11 can be connected to a gripping portion 34 of the joining member 30 that extends from the slot 24 between the structural members 20, 22. The first actuator 11 can be connected thereto by a variety of connection devices such as a hydraulically, pneumatically, or mechanically adjustable gripping device 12.

According to some embodiments of the present invention, the apparatus 10 also includes a clamping device 14 that can be used to secure the position of the structural members 20, 22 during joining. The clamping device 14 can define a clamping channel 16, which can extend the entire length of the clamping device 14 or only partially therethrough. Additionally, the channel 16 can include multiple channels, which can be parallel or collinear. The channel 16 is configured to receive clamping portions 26, 28 that extend from each of the structural members 20, 22. The clamping portions 26, 28 of the structural members 20, 22 define clamping surfaces 27, 29 that engage the clamping channel 16 and prevent the structural members 20, 22 from moving apart, i.e., opening the slot 24. Thus, the engagement of the clamping surfaces 27, 29 with the channel 16 prevents the slot 24 between the structural members 20, 22 from opening and opposes the urging force of the joining member 30 into the slot 24. If the clamping channel 16 does not extend entirely through the clamping device 14, the channel 16 can also prevent transverse motion of the structural members 20, 22, i.e., in directions denoted by reference numerals 38a, 38b. The structural members 20, 22 can be secured to the clamping device 14 by clamps 15a, 15b or by bolts, tack welding, tooling, or the like. The clamping device 14 can be integral to, or connected to a backing plate 18, table, or to a device for imparting movement, such as a computer numeric control (CNC) machine or similar device, as is known in the art.

According to one embodiment, the structural members 20, 22 are disposed generally within a plane, and the urging force of the joining member 30 is directed generally normal to the plane. As the joining member 30 is urged into the slot 24, the joining member 30 engages the angled joining surfaces of the structural members and urges the structural members 20, 22 apart. The clamping surfaces 21, 23 of the structural members 20, 22 engage the clamping channel 16 of the clamping device 14 and are restrained so that the slot 24 does not open. The urging force of the joining member 30 into the slot 24 can develop sufficient force against the structural members 20, 22 for linear friction welding of the joining member 30 to the joining surfaces 21, 23.

The joining member 30 is friction welded to the first and second structural members 20, 22 to form weld joints 36, 37 between the joining surfaces 21, 23 and the joining member 30. Friction welding is accomplished by moving the joining member 30 relative to the structural members 20, 22. The apparatus 10 can include a second actuator 13 for alternatingly moving the joining member 30 in the opposed directions 38a, 38b, which are generally parallel to a lengthwise direction of the slot 24 and the joining member 30. For example, the second actuator 13 can oscillate the joining member 30 a distance of about ⅛ inch at a rate of about 60 hertz. Other oscillation distances and frequencies can also be used. The second actuator 13 can be engaged to the joining member 30 through the same gripping device 12 as the first actuator 11. The second actuator 13 can be a hydraulic, pneumatic, or electric device, and in some embodiments the first and second actuators 11,13 are an integral device. As the joining member 30 is urged and moved against the structural members 20, 22, a compressive force is established between the engaged surfaces of the joining member 30 and the structural members 20, 22. The compressive force is typically great enough to result in a pressure between the structural members 20, 22 of at least about 1000 pounds per square inch, for example, about 20,000 pounds per square inch.

The motion of the joining member 20, 22 is continued while the compressive force is maintained resulting in friction between the joining member 30 and the structural members 20, 22. The friction results in heating of the joining member 30 and the joining surfaces 21, 23, which causes plasticized regions to form about the engaged surfaces. Once sufficient plasticization has occurred, the motion of the joining member 30 is terminated. Plasticization can be detected, for example, by mechanical or optical measurements, or friction welding can be continued for a predetermined duration based on such factors as the type of materials being joined, the size of the joint, the compressive force, and the type of joint being formed. After the motion of the joining member 30 is terminated, the compressive force can be maintained by continuing to urge the joining member 30 into the slot 24 as the joining member 30 and the structural members 20, 22 cool to thereby form the friction weld joints 36, 37.

Figure 3:
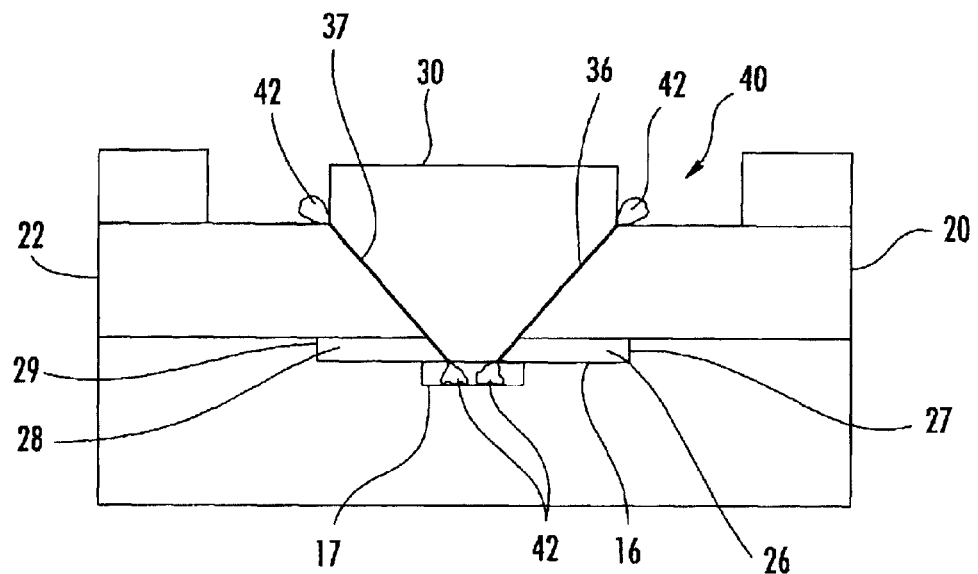
FIG. 3 is a partial elevation view illustrating a preform formed by joining the structural members of FIG. 1 according to one embodiment of the present invention.

As shown in FIG. 3, the clamping device 14 can also define an aperture 17 in the channel 16 for receiving flash formed during the welding process. Flash generally refers to plasticized material from the joining member 30 or structural members 20, 22 that is extruded from between the joining member 30 and the structural members 20, 22 during friction welding due to the compressive force therebetween. The flash, generally referred to by reference numeral 42, can collect to form a bead or multiple isolated deposits as illustrated in FIGS. 3 and 4. The aperture 17 can be a channel-shaped groove, as shown, or one or more partial or through bores in the clamping device 14. As shown in FIG. 4, the flash 42 can also be directed from between the joining member 30 and the joining surfaces 21, 23 proximate to the gripping portion 34 of the joining member 30 and longitudinally from the ends of the slot 24. The flash 42 is typically removed when machining the preform 40 to form the structural assembly 50.

As shown in FIGS. 3 and 4, the joining member 30 joins the structural members 20, 22 to form the preform 40, which can be trimmed to form the structural assembly 50. For example, the gripping portion 34 of the joining member 30, the clamping portions 26, 28 of the structural members 20, 22, and the flash 42 can be trimmed by any known means, including using a manual or computer-guided machining device, such as a CNC machine. For clarity of illustration, the trimmed portions are shown in unitary form in FIG. 5, but these portions are typically broken up during trimming. Other portions of the joining member 30 and/or the structural members 20, 22 can also be trimmed to form the structural assembly 50. For example, as shown in FIG. 5, a portion 31 of the joining member 30 disposed between the clamping portions 26, 28 of the structural members 20, 22 can be trimmed. Preferably, the preform 40 is trimmed according to predetermined dimensions corresponding to a desired configuration of the structural assembly 50.

Figure 7:
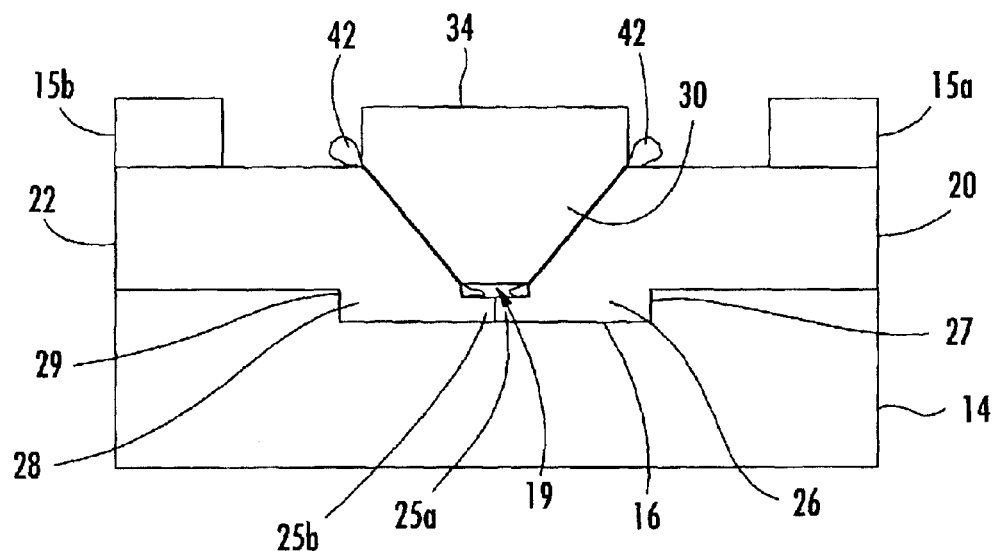
FIG. 7 is a partial elevation view illustrating first and second structural members joined to form a preform according to another embodiment of the present invention.
Figure 8:
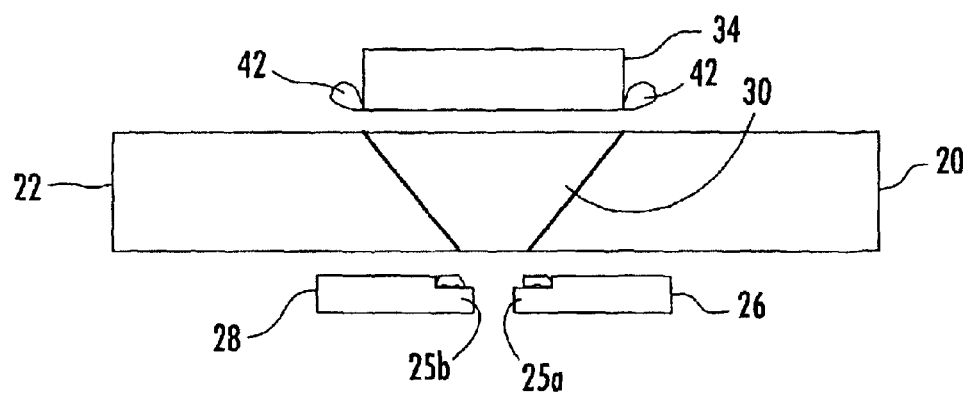
FIG. 8 is a partial elevation view illustrating a structural assembly formed by trimming the preform of FIG. 7.

The engagement of the clamping surfaces 27, 29 of the structural members 20, 22 to the clamping device 14 can also facilitate an alignment of the structural members 20, 22. For example, the clamping portions 26, 28 and the clamping surfaces 27, 29 of the structural members 20, 22 can be configured so that as the clamping surfaces 27, 29 are engaged to the clamping channel 16 of the clamping device 14, the structural members 20, 22 are configured in their desired configuration. Additionally, each of the clamping portions 26, 28 of the structural members 20, 22 can include an alignment portion 25a, 25b as shown in FIGS. 7 and 8. The alignment portions 25a, 25b are configured to be engaged when the clamping portions 26, 28 of the structural members 20, 22 are received by the clamping channel 16. Thus, as shown in FIG. 7, the alignment portions 25a, 25b of the structural members 20, 22 engage to form an interface therebetween. Preferably, when the alignment portions 25a, 25b are engaged, the structural members 20, 22 are configured in the desired configuration for joining. The clamping portions 26, 28 of the structural members 20, 22 can also define a space 19 between the interface of the clamping portions 26, 28 and the joining member 30 for receiving the flash 42 during joining, similar to the aperture 17 described above. As shown in FIG. 8, the preform 40 formed from the structural members 20, 22 can be trimmed to remove the flash 42, the gripping portion 34, the clamping portions 26, 28, and/or other portions of the joining member 30 and the structural members 20, 22 to form the structural assembly 50.

Figure 9:
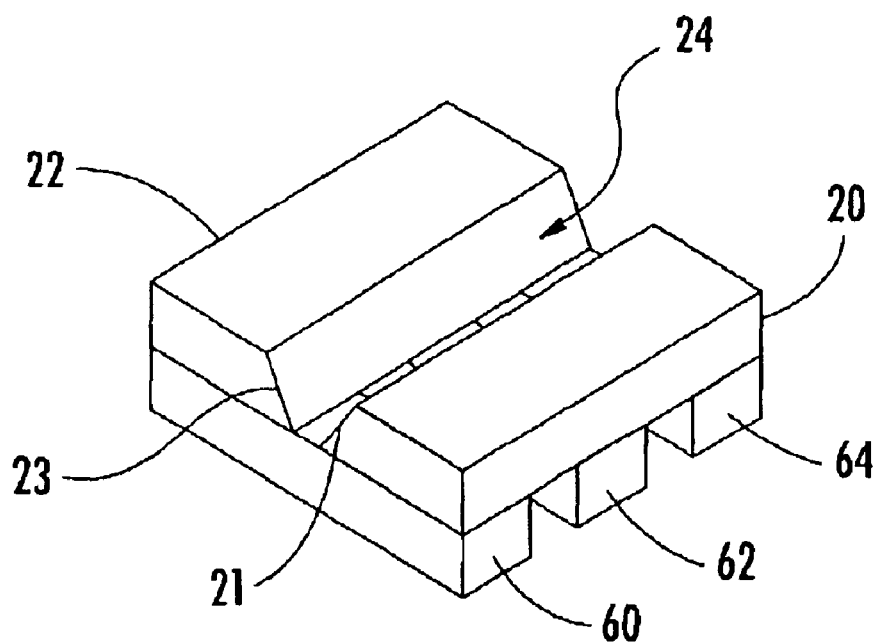
FIG. 9 is a perspective view illustrating two structural members joined by three additional structural members and configured for joining according to another embodiment of the present invention.
Figure 10:
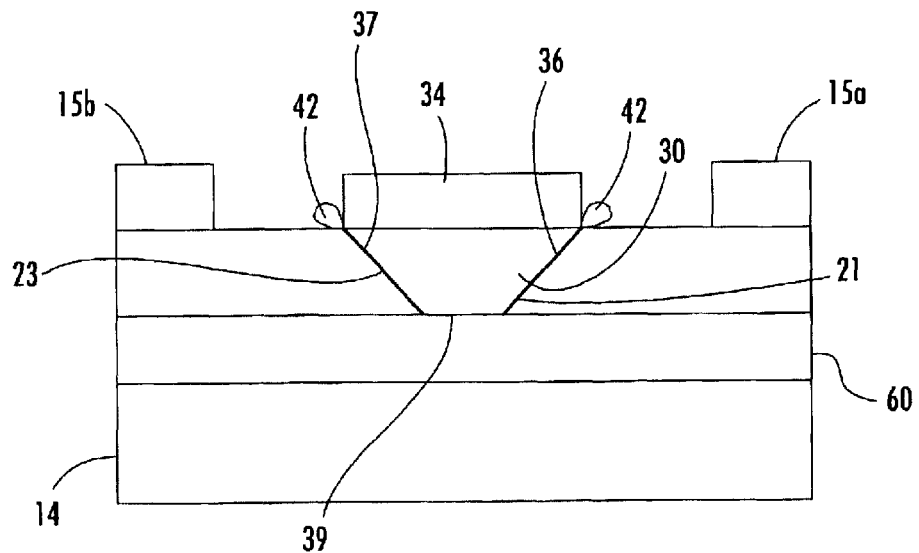
FIG. 10 is a partial elevation view illustrating a preform formed by joining the structural members of FIG. 9 according to one embodiment of the present invention.
Figure 11:
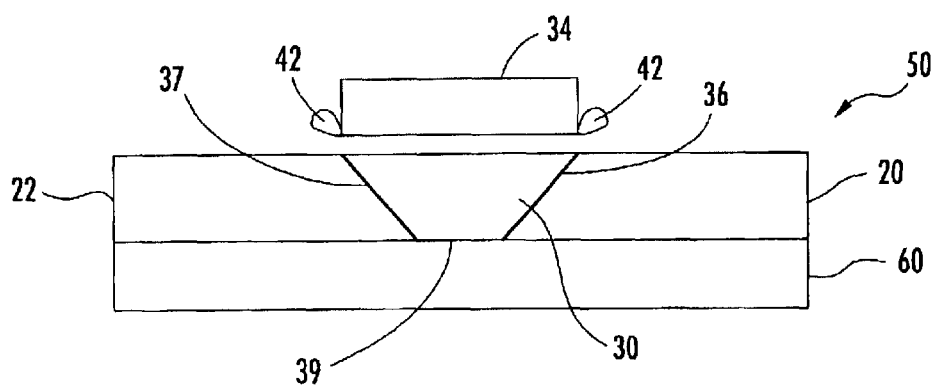
FIG. 11 is a partial elevation view illustrating a structural assembly formed by trimming the preform of FIG. 10.

While the clamping device 14 described above can be used to maintain the configuration of the structural members 20, 22 during friction welding, the structural members 20, 22 can also be restrained in other manners. For example, according to another embodiment of the present invention shown in FIGS. 9–11, one or more additional structural members 60, 62, 64 can be connected to the first and second structural members 20, 22 to hold the first and second structural members 20, 22 in place while the joining member 30 is welded thereto. For example, the additional structural members 60, 62, 64 can be friction welded to the first and second structural members 20, 22 by linear friction welding, rotational friction welding, or friction stir welding, or the additional members 60, 62, 64 can be joined by other conventional fastening methods. Similar to the clamping device 14 described above, the additional structural members 60, 62, 64 maintain the relative position of the first and second structural members 20, 22 to prevent the slot 24 from opening when the joining member 30 is urged into the slot 24. Any number of the additional structural members can be used, and the joining member 30 can be friction welded to the additional structural members 60, 62, 64 to form joints 39 therebetween such that the additional structural members 60, 62, 64 preferably form part of the preform 40 and the finished structural assembly 50. The clamping device 14 and clamps 15a, 15b can be used to secure the structural members 20, 22, 60, 62, 64 while the joining member 30 is joined thereto, as shown in FIG. 10. For example, the clamps 15a, 15b can be vise-like devices that are adjusted to hold the structural member 20, 22, 60, 62, 64 securely in place against the clamping device 14. Alternatively, the structural members 20, 22, 60, 62, 64 can be secured to the clamping device 14 by bolts, tack weld, tooling, or the like. As illustrated in FIG. 11, the flash 42, gripping portion 34, and/or other portions of the joining member 30 or structural members 20, 22, 60, 62, 64 can be trimmed to form the structural assembly 50.

Figure 12:
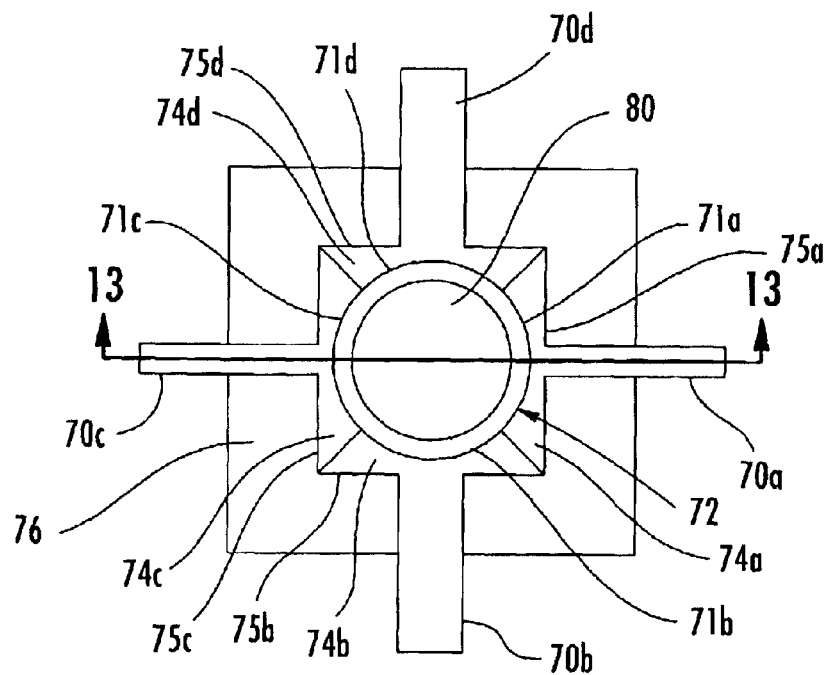
FIG. 12 is a plan view of four structural members configured for joining according to another embodiment of the present invention.
Figure 13:
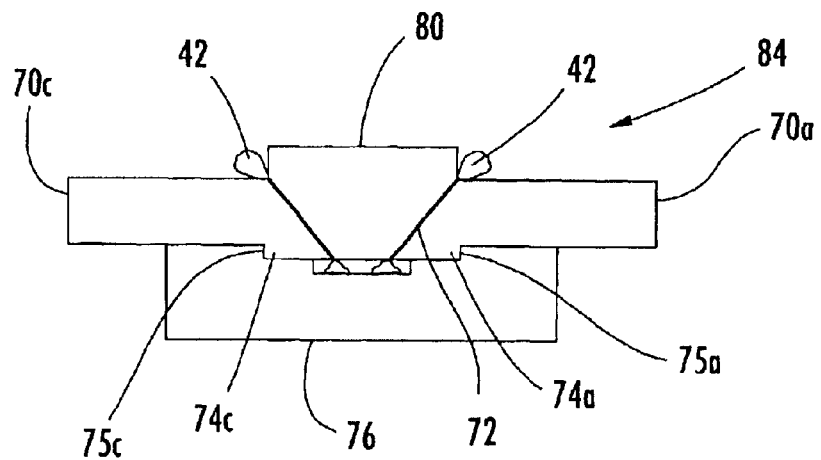
FIG. 13 is a section view of a preform formed by joining the structural members of FIG. 12 as seen along line 13—13 of FIG. 12.

The structural members can also be joined by other joining methods, such as rotational friction welding, illustrated in FIGS. 12–15. In FIG. 12, four structural members 70a–d are shown configured for joining, though any number of members can be joined. Each of the structural members 70*a*–*d* defines a joining surface 71*a*–*d*, and the joining surfaces 71*a*–*d*, are positioned to define an angled, or converging, aperture 72 between the structural members 70*a*–*d*. The aperture 72 can define a variety of angled shapes, for example, an angled slot, as described above. Alternatively the aperture 72 can define a frustocone, or at least part of a tapered bore, as shown in FIGS. 12 and 13. As described above, each of the structural members 70*a*–*d* can define a clamping portion 74*a*–*d* that is at least partially received by a clamping device 76. The clamping device 76 can engage a clamping surface 75*a*–*d* of each clamping portion 74*a*–*d* and prevent the structural members 70*a*–*d* from moving outward to open the aperture 72. A joining member 89 corresponds to the angle of the aperture 72 so that, as the joining member 80 is urged into the aperture 72, the joining member 80 urges the structural members 70*a*–*d* outward from the aperture 72. The joining member 80 is then moved against the joining surfaces 71 *a*–*d* of the structural members 70*a*–*d*, for example, by rotating the joining member 80 about an axis that is generally collinear with a longitudinal axis of the aperture 72 and the joining member 80. The relative motion of the joining member 80 against the joining surfaces 71*a*–*d* causes a frictional force therebetween, heating the joining member 80 and/or the structural members 70*a*–*d* to a plasiticizing temperature for friction welding. When a sufficient temperature and sufficient plasticizing have been achieved for friction welding, the joining member 80 is stopped. As described above, the joining member 80 can be urged into the aperture 72 after the joining member 80 is stopped and until the structural members 70*a*–*d* and the joining member 80 cool so that a joint is formed therebetween.

Figure 14:
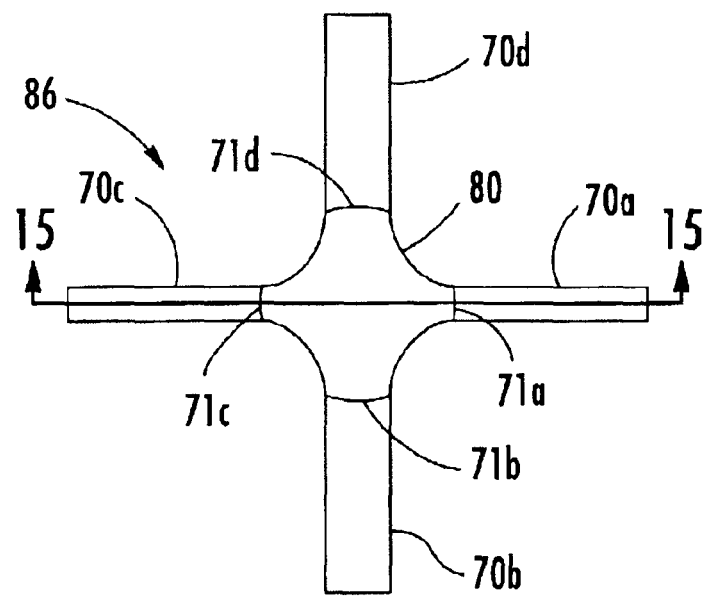
FIG. 14 is a plan view of a structural assembly formed by trimming the preform of FIG. 13.
Figure 15:
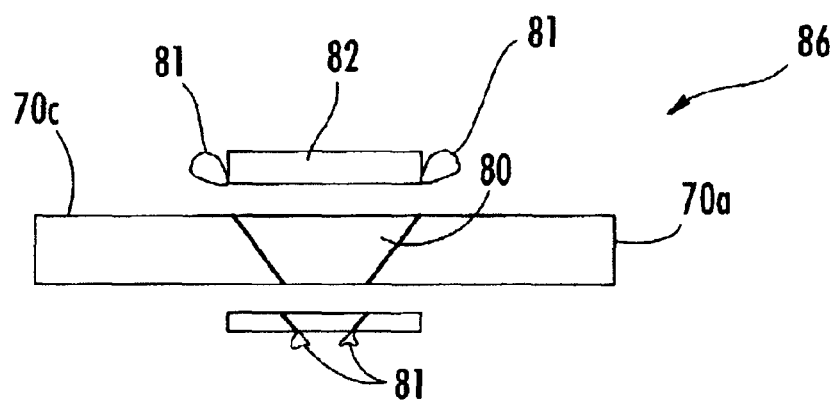
FIG. 15 is a section view of the structural assembly of FIG. 14 as seen along line 15—15 of FIG. 14.

As shown in FIGS. 14 and 15, a preform 84 formed by joining the structural members 70*a*–*d* is trimmed to form a structural assembly 86. For example, a gripping portion 82 of the joining member 80, clamping portions 74*a*–*d* of the structural members 70*a*–*d*, flash 81, and the like can be trimmed from the preform 84. Additionally, as shown in FIG. 14, the clamping portions 74*a*–*d* can be larger in combination than the joining member 80 and the desired size of the final structural assembly 86. For example, the clamping portions 74*a*–*d* defined by the structural members 70*a*–*d* shown in FIG. 12 are larger than the joining member 80 so that the clamping surfaces 75*a*–*d* of the clamping portions 74*a*–*d* can define the aperture 72. The relatively large clamping portions 74*a*–*d* are provided to accommodate the joining member 80. After the structural members 70*a*–*d* have been joined, the clamping portions 74*a*–*d* and the joining member 80 are then trimmed to achieve the desired shape and size of the structural assembly 86.

Figure 16:
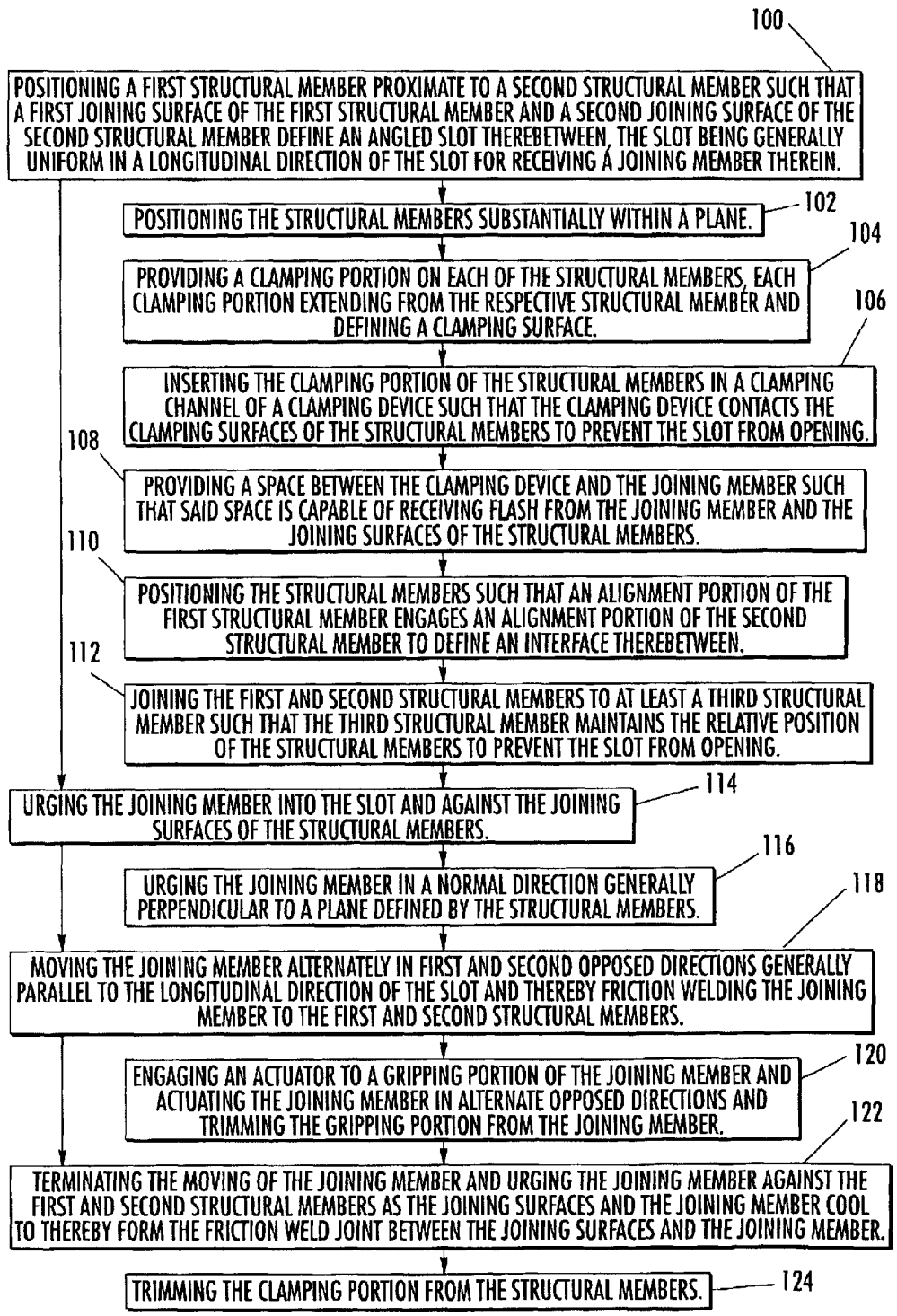
FIG. 16 is a flow chart illustrating a method for forming a preform and structural assembly according to one embodiment of the present invention.

Referring now to FIG. 16, there are illustrated the operations for joining structural members to form a structural assembly according to one embodiment of the present invention. A first structural member is positioned proximate to a second structural member so that a first joining surface of the first structural member and a second joining surface of the second structural member define an angled slot therebetween. The slot is generally uniform in a lengthwise direction for receiving a joining member therein. See Block 100. For example, the structural members can be positioned substantially within a plane. See Block 102. A clamping portion can be provided on each of the structural members. Each clamping portion extends from the respective member and defines a clamping surface. See Block 104. The clamping portions are inserted in a clamping channel of a clamping device so that the clamping device contacts the clamping surfaces of the structural members to prevent the slot from opening. See Block 106. A space can be provided between the clamping device and the joining member to receive flash from the joining member and the joining surfaces of the structural members. See Block 108. The structural members can also be positioned so that alignment portions thereof are engaged to define an interface. See Block 110. The structural members can also be joined to at least a third structural member that maintains the relative position of the first and second structural members to prevent the slot from opening. See Block 112. The joining member is urged into the slot and against the joining surfaces of the structural members. See Block 114. For example, the joining member can be urged in a normal direction generally perpendicular to a plane defined by the members. See Block 116. The joining member is moved alternately in first and second opposed directions generally parallel to the lengthwise direction of the slot to thereby friction weld the joining member to the structural members. See Block 118. For example, an actuator can be engaged to a gripping portion of the joining member to actuate the joining member in alternate opposed directions, and the gripping portion can then be removed from the joining member. See Block 120. The moving of the joining member is terminated, for example, after a predetermined duration of time or upon mechanical, thermal, or optical detection of sufficient plasticization. The joining member can be urged against the structural members as the joining surfaces and the joining member cool to form the friction weld joint therebetween. See Block 122. The clamping portions of the structural members can then be trimmed. See Block 124.

Figure 17:
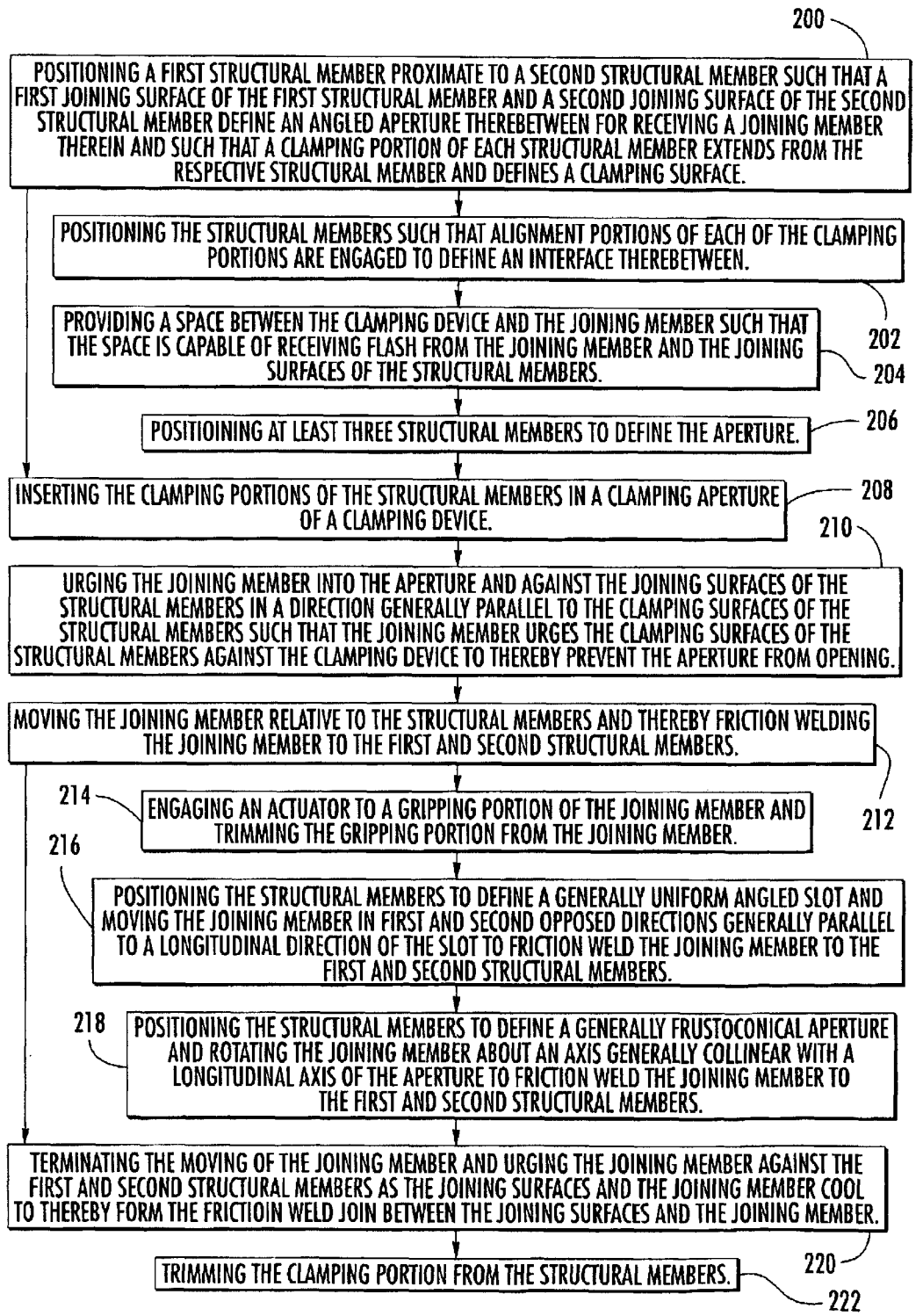
FIG. 17 is a flow chart illustrating a method for forming a preform and a structural assembly according to another embodiment of the present invention.

FIG. 17 illustrates the operations for joining structural members according to another embodiment of the present invention. A first structural member is positioned proximate to a second structural member so that a first joining surface of the first structural member and a second joining surface of the second structural member define an angled aperture therebetween for receiving a joining member. A clamping portion of each structural member extends from the respective structural member and defines a clamping surface. See Block 200. For example, the structural members can be positioned so that alignment portions of each of the clamping portions are engaged to define an interface therebetween. See Block 202. A space can be provided between the clamping device and the joining member to receive flash from the joining member and the joining surfaces of the structural members. See Block 204. Further, more than two structural members can be positioned to define the aperture so that at least three structural members are joined to form the structural assembly. See Block 206. The clamping portions of the structural members are inserted in a clamping aperture of a clamping device. See Block 208. The joining member is urged into the aperture and against the joining surfaces of the structural members in a direction generally parallel to the clamping surfaces of the structural members so that the joining member urges the clamping surfaces of the structural members against the clamping device to thereby prevent the aperture from opening. See Block 210. The joining member is also moved relative to the structural members to friction welding the joining member thereto. See Block 212. For example, an actuator can be engaged to a gripping portion of the joining member to actuate the joining member in alternate opposed directions, and the gripping portion can be subsequently trimmed. See Block 214. According to one aspect of the invention, the structural members arc positioned to define a generally uniform angled slot, and the joining member is moved in first and second opposed directions generally parallel to a lengthwise direction of the slot to friction weld the joining member to the structural members. See Block 216. Alternatively, the structural members can be positioned to define a generally frustoconical aperture, and the joining member can be rotated about an axis generally collinear with a longitudinal axis of the aperture to friction welding the joining member to the structural members. See Block 218. The motion of the joining member is terminated, for example, after a predetermined duration of time or upon mechanical, thermal, or optical detection of sufficient plasticization. After terminating the motion, the joining member can be urged against the structural members as the joining surfaces and the joining member cool to form the friction weld joint therebetween. See Block 220. The clamping portion can then be trimming from the structural members. See Block 222.

Many modifications and other embodiments of the invention will come to mind to one skilled in the art to which this invention pertains having the benefit of the teachings presented in the foregoing descriptions and the associated drawings. For example, the structural members can be processed before and/or after joining by friction welding. Such processing can include cleaning the joining surfaces of the structural members to remove oxidation or surface defects. Additionally, the structural members can be heat treated by aging, quenching, stretching, annealing, or solution annealing to obtain desired mechanical or chemical properties, as is known in the art. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of joining at least two structural members to form a structural assembly, the method comprising:

positioning a first structural member proximate to a second structural member such that a first joining surface of the first structural member and a second joining surface of the second structural member define an angled slot therebetween, the slot being generally uniform in a lengthwise direction of the slot for receiving a joining member therein;

urging the joining member into the slot and against the joining surfaces of the structural members; and at least partially concurrently with said urging step, moving the joining member alternately in first and second opposed directions generally parallel to the lengthwise direction of the slot and thereby friction welding the joining member to the first and second structural members.

2. A method according to claim 1 wherein said positioning step comprises positioning the structural members substantially within a plane and wherein said urging step comprises urging the joining member in a normal direction generally perpendicular to the plane.

3. A method according to claim 1 further comprising providing a clamping portion on each of said structural members, each clamping portion extending from the respective structural member and defining a clamping surface generally parallel to the direction of urging of the joining member.

4. A method according to claim 3 further comprising inserting the clamping portion of the structural members in a clamping channel of a clamping device such that the clamping device contacts the clamping surfaces of the structural members to prevent the slot from opening during the urging step.

5. A method according to claim 3 further comprising, subsequent to said moving step, trimming the clamping portion from the structural members.

6. A method according to claim 4 further comprising providing a space between the clamping device and the joining member such that said space is capable of receiving flash from the joining member and the joining surfaces of the structural members during said moving step.

7. A method according to claim 1 wherein said positioning step comprises positioning the structural members such that an alignment portion of the first structural member engages an alignment portion of the second structural member to define an interface therebetween.

8. A method according to claim 1 wherein said positioning step comprises joining the first and second structural members to at least a third structural member such that the third structural member maintains the relative position of the structural members to prevent the slot from opening during said urging step.

9. A method according to claim 1 wherein said moving step comprises engaging an actuator to a gripping portion of the joining member and actuating the joining member in alternate opposed directions and further comprising, subsequent to said moving step, trimming the gripping portion from the joining member.

10. A method according to claim 1 further comprising:

terminating said moving step; and concurrently with said terminating step, urging the joining member against the first and second structural members as the joining surfaces and the joining member cool to thereby form the friction weld joint between the joining surfaces and the joining member.

11. A method of joining at least two structural members to form a structural assembly, the method comprising:

positioning a first structural member proximate to a second structural member such that a first joining surface of the first structural member and a second joining surface of the second structural member define an angled aperture therebetween for receiving a joining member therein and such that a clamping portion of each structural member extends from the respective structural member and defines a clamping surface;

inserting the clamping portions of the structural members in a clamping aperture of a clamping device;

urging the joining member into the aperture and against the joining surfaces of the structural members in a direction generally parallel to the clamping surfaces of the structural members such that the joining member urges the clamping surfaces of the structural members against the clamping device to thereby prevent the aperture from opening; and at least partially concurrently with said urging step, moving the joining member relative to the structural members and thereby friction welding the joining member to the first and second structural members.

12. A method according to claim 11 wherein said positioning step comprises positioning the structural members to define a generally uniform angled slot and said moving step comprises moving the joining member in first and second opposed directions generally parallel to a lengthwise direction of the slot and thereby friction welding the joining member to the first and second structural members.

13. A method according to claim 11 wherein said positioning step comprises positioning the structural members to define a generally frustoconical aperture and said moving step comprises rotating the joining member about an axis generally collinear with a longitudinal axis of the aperture and thereby friction welding the joining member to the first and second structural members.

14. A method according to claim 11 further comprising, subsequent to said moving step, trimming the clamping portion from the structural members.

15. A method according to claim 11 wherein said positioning step comprises positioning the structural members such that alignment portions of each of the clamping portions are engaged to define an interface therebetween.

16. A method according to claim 11 further comprising providing a space between the clamping device and the joining member such that said space is capable of receiving flash from the joining member and the joining surfaces of the structural members during said moving step.

17. A method according to claim 11 wherein said positioning step comprises positioning at least three structural members to define the aperture and wherein said moving step comprises friction welding the at least three structural members.

18. A method according to claim 11 wherein said moving step comprises engaging an actuator to a gripping portion of the joining member and further comprising, subsequent to said moving step, trimming the gripping portion from the joining member.

19. A method according to claim 11 further comprising:
terminating said moving step; and
concurrently with said terminating step, urging the joining member against the first and second structural members as the joining surfaces and the joining member cool to thereby form the friction weld joint between the joining surfaces and the joining member.

* * * * *

UNITED STATES PATENT AND TRADEMARK OFFICE
CERTIFICATE OF CORRECTION

PATENT NO. : 6,779,708 B2
DATED : August 24, 2004
INVENTOR(S) : Slattery

It is certified that error appears in the above-identified patent and that said Letters Patent is hereby corrected as shown below:

Title page,
Item [56], References Cited, OTHER PUBLICATIONS, insert the following:
-- Website of TWI Technology at http://www.twi.co.uk/techfile/tffricli.html; 1 page dated December 8, 2000.
Website of TWI Technology at http://www.twi.co.uk/connect/may00/c1063.html; 3 pages dated December 8, 2000.
Website of University of Southhampton, Faculty of Mathematical Studies at http://www.maths.soton.ac.uk/esgi98/problems/rolls.html; 1 page dated December 8, 2000.
Website of MTS Systems Corporation at http://www.mts.com./aesd/AdvanMan.htm; 2 pages dated December 8, 2000 (Copyright 2000).
Website of MTS Systems Corporation at http://www.mts.com/aesd/aerospace_engine.htm; 1 page dated November 13, 2000 (Copyright 2000).
Website of Inside Communications Limited at http://www.insidecom.co.uk/pwe/editorial/pwe352.htm; 2 pages dated November 13, 2000.
Advanced Materials & Processes 2/91; Tech Spotlight, Linear friction welding joins noncircular sections; pg. 47.
D. L. Hollar, JR.; Resistance Seam Welding of Thin Copper Foils; Welding Journal; June, 1993; pages 37-40. --.

Signed and Sealed this

Eighteenth Day of January, 2005

JON W. DUDAS
*Director of the United States Patent and Trademark Office*